Dec. 24, 1963        A. PREVIATI        3,115,353
SEALING DEVICE BETWEEN A FLEXIBLE TUBE AND ITS RIGID CONNECTOR
Filed March 10, 1961
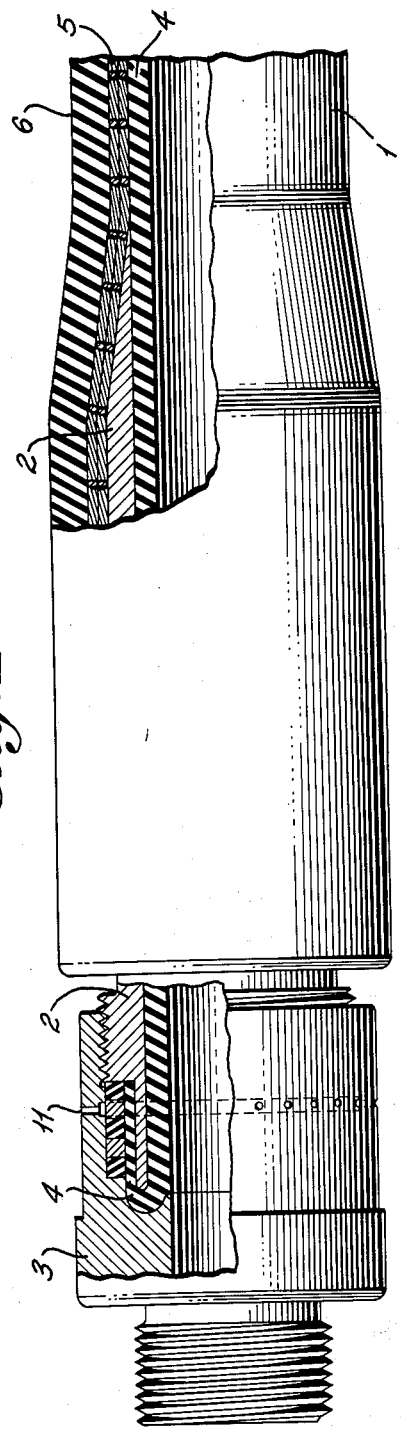
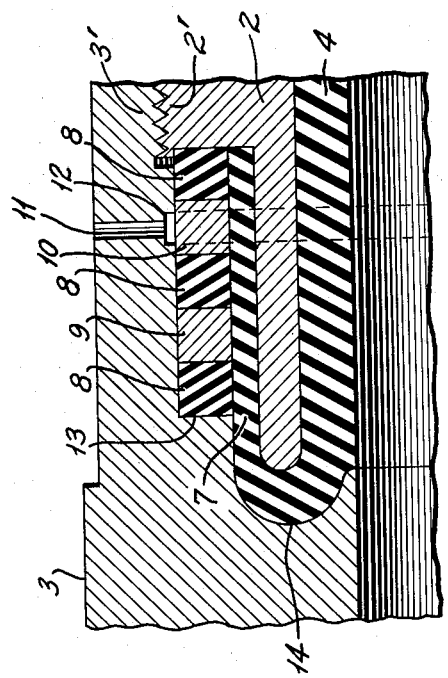
INVENTOR
Augusto Previati
BY Stevens, Davis, Miller & Mosher
ATTORNEYS

United States Patent Office 3,115,353
Patented Dec. 24, 1963

---

3,115,353
SEALING DEVICE BETWEEN A FLEXIBLE TUBE AND ITS RIGID CONNECTOR
Augusto Previati, Milan, Italy, assignor to
Pirelli S.p.A., Milan, Italy
Filed Mar. 10, 1961, Ser. No. 94,877
Claims priority, application Italy Mar. 17, 1960
2 Claims. (Cl. 285—14)

The present invention relates to flexible tubes which are used for the conveyance of fluids under high and very high pressures, for example, for the pumping of drilling mud for drilling oil wells. Tubes of this type are provided with metallic connectors for the purpose of constructing an elongated conduit by interconnecting a plurality of shorter lengths of tubing. More particularly, the present invention relates to an improvement in the sealing means which is provided between the tube and its metallic connector.

In flexible tubes of the type described herein, a tight seal is usually obtained by mounting a packing having a flexible fin onto the underlayer of the cable, the underlayer being an elastic element generally formed of rubber or suitable material. This packing is disposed adjacent the rigid connector and, by virtue of the fluid pressure, adheres to the connector and prevents fluid from penetrating between the latter and the outer wall of the underlayer. Thus, this structure is designed to prevent any leak of fluid through the rigid connector and to avoid any seepage of fluid between the connector and the outer wall of the underlayer, the latter condition resulting in a consequent detachment of the underlayer from the tube itself. The remaining portion of the tube is provided with a reinforcing structure generally constituted by metal wires or cords wound up in helical form and disposed in two layers crossed with respect to each other.

Another system for effecting a tight seal proposes the injecting of rubber or other elastic material between the underlayer and the connector; the holes necessary for the injections are then closed by means of suitable lag screws.

In general, the proposals which have been employed (and submitted) for the purpose of providing an effective seal have involved the use of a single packing, the operation of which is very delicate. For example, in the drilling of oil wells, it is sometimes necessary to discontinue the flow of drilling mud for a short period of time; it has been observed that the drilling mud can dry in the cavity of the packing so as to deform the fin and detach it from the surfaces involved in the seal. Later, when the mud pump is started again, it is impossible to establish the desired seal.

Furthermore, the single packing member, referred to above, which is employed for effecting the desired seal, is an integral part of the underlayer and, as suggested, cannot be replaced. Thus, when the seal is compromised, in the manner described above, the tube itself must be taken out of service. Since tubes of this nature are very expensive, the inconvenience becomes a problem of major significance.

A further inconvenience of the devices and systems referred to above resides in the fact that there is no indicating means which will tell in advance that a rupture of the packing is about to occur so as to prevent further damage or destruction of the tube.

The present invention is designed to eliminate the above described difficulties and inconveniences; this invention is based upon the following main principles:

(1) At least two sealing barriers are provided;
(2) The packings forming the sealing barriers are removable and replaceable; and
(3) The tube is supplied with a means for indicating the seepage of fluid past the first barriers.

The connector employed in the present invention comprises two separate metallic elements, one of which is referred to herein as the connector barrel and the other as the connector head. The underlayer of the flexible tube is extended and folded over the outside of the connector barrel so as to form a rubber cover thereon. A series of packings comprising at least two replaceable sealing rings of rubber or similar elastic material, having a quadrangular cross section, intercalated by metallic rings having the same cross section, are received over the rubber cover. The connector head fits over the rubber cover and the rings and screws onto the connector barrel. The inner wall of the connector head is provided with a duct located adjacent the last metallic ring. (The word "last" here means the last ring to be reached by fluid in case of a leak.) A plurality of radial holes extend outwardly from the duct to the atmosphere. The duct will indicate, by the outflow of liquid, that the fluid has passed beyond the first two seals effected by the rubber rings. It should be mentioned here, that the duct must be located adjacent a metallic ring. Otherwise, if the duct were opposite a rubber ring, the rubber would be forced into the duct and thus would form an obstruction; therefore, the device would not operate as an indicator to show when the seal became ineffective.

In light of the above, it is a principal object of the present invention to provide a sealing device of the type described above which will be removable and, hence, replaceable.

It is another object of the present invention to provide a sealing device in which there are at least two sealing barriers.

It is a further object of the present invention to provide a sealing device of the type described above wherein the device is provided with a means for indicating a leakage around the first sealing barriers.

Other and further objects and advantageous features of the present invention will hereinafter more fully appear in connection with a detailed description of the drawings in which:

FIGURE 1 is a longitudinal elevation, with certain parts broken away and with certain parts in section, showing a tube and connector provided with a sealing device constructed in accordance with the present invention; and FIGURE 2 is a sectional view, on an enlarged scale, showing the details of the sealing device.

Referring to the drawings in detail, FIGURE 1 shows a flexible tube 1 and a metal connector consisting of an inner barrel 2 and an outer connector head 3. The flexible tube is provided with an underlayer 4 made of rubber or other suitable material, the latter being reinforced with a metal armor 5 consisting of two layers which are wound in a helical form and which are crossed with respect to one another. The tube 1 is provided with an outer protective covering 6 of rubber or suitable material. In addition to the above described elements, the tube 1 may also be provided with other protective layers of rubberized cloth (not shown) which can be applied over or under the reinforcing layers 5.

FIGURE 2 shows, in greater detail, the sealing elements constituting the essential features of the present invention. As shown in this figure, the underlayer 4 is provided with an extension 7 which is suitably folded over the extreme left-hand portion of the connector barrel 2. Three rubber rings, all designated by the reference numeral 8, and two intercalated metal rings 9 and 10 are disposed over the folded portion 7 of the underlayer 4. It should be noted that the rubber rings and the metallic rings all have a quadrangular cross section. The connector barrel 2 is provided with a threaded flange 2' and the connector head 3 is provided with a threaded portion 3' such, that the connector head can be screwed onto the connector barrel. The connector head 3 is provided with a plurality of radial holes 11 which communicate with a duct 12 disposed on the inner surface of the head 3 in a position opposite the metal ring 10. The metal ring 10 represents the last metal ring in the direction of any possible fluid leak.

The connector head 3 is provided with a radially inwardly projecting abutment 13, the latter forming with the threaded flange 2, with the folded portion 7 and with the inner surface of the connector head, an annular space in which the rings are received. The mechanical pressure exerted on the rings longitudinally can be varried by screwing the connector head more or less tightly onto the connector barrel. Preferably, the connector head is also suitably shaped, as at 14, to conform with the profile of the bend between the extension 7 and the underlayer 4.

It should be apparent from the foregoing, considered particularly in light of the drawings, that the rubber rings 8 and the metallic rings 9 and 10 are removable and, hence, replaceable. As indicated heretofore, if there is any leakage of fluid through the connector, the fluid will pass between the head 3 and the folded portion 7, beyond the first two rubber rings 8, past the first metal ring 9, and thereafter into the duct 12 from which the fluid then seeps through the holes 11. At this point, the operator at the drilling rig will become aware of the fact that there is a leakage through the metallic connector; the equipment can be shut down temporarily, the connector head 3 can be screwed off the connector barrel 2 and rubber rings 8 can be replaced as desired.

Whereas the present invention has been described in particular relation to the illustrations in the drawings, it should be apparent that other and further modifications, apart from those shown or suggested herein, may be made within the spirit and scope of this invention.

What is claimed is:

1. A sealing device for effecting a fluid-tight seal between a flexible tube and a rigid connector for said tube comprising a flexible tube having internal layers of metallic reinforcement, and outer protective covering, an underlayer of rubber disposed radially inwardly with respect to said layers of reinforcement and extending axially beyond the terminus of said reinforcement and said covering, a metallic connector including a substantially cylindrical connector barrel and a connector head threadedly engaging a radially extending shoulder on said connector barrel, one end of said connector barrel being received within said flexible tube between the layers of reinforcement and said underlayer, said underlayer extending beyond said terminus being provided with an extension folded rearwardly over and extending parallel to the other end of said connector barrel, at least one pair of removable sealing rings made of elastic material frictionally encircling and tightly embracing said folded rubber extension, the outer peripheries of said sealing rings sealingly engaging the inner surface of said connector head, a removable metal ring intercalataed between said pair of sealing rings, each of said rings abutting an adjacent ring, said connector head forming with said connector barrel and folded rubber portion an annular space in which said rings are received, said connector head also being provided with an inner annular duct communicating with said annular space and being aligned radially outward of said metal ring, said connector head being provided with a plurality of circumferentially spaced aligned holes in open communication with said duct and extending radially outwardly from said duct to the atmosphere.

2. A sealing device as defined by claim 1, wherein there are three sealing rings and two metallic rings each intercalated between a pair of said sealing rings, said duct being aligned radially outward of the metallic ring remote from the fold of said extension.

References Cited in the file of this patent

UNITED STATES PATENTS

| | | |
|---|---|---|
| 502,234 | Moran | July 25, 1893 |
| 715,641 | Cronk | Dec. 9, 1902 |
| 1,038,396 | Langford | Sept. 10, 1912 |
| 1,460,105 | Malone | June 26, 1923 |
| 1,847,218 | Lamb | Mar. 1, 1932 |
| 1,875,749 | McEvoy | Sept. 6, 1932 |
| 2,220,785 | Goodall | Nov. 5, 1940 |
| 2,478,149 | Wolfram et al. | Aug. 2, 1949 |
| 2,511,158 | Gray | June 13, 1950 |
| 2,513,115 | Sprigg | June 27, 1950 |
| 2,798,747 | Auer | July 9, 1957 |

FOREIGN PATENTS

| | | |
|---|---|---|
| 113,042 | Germany | Sept. 6, 1900 |